US008848895B2

(12) United States Patent  
Desai et al.

(10) Patent No.: US 8,848,895 B2  
(45) Date of Patent: Sep. 30, 2014

(54) METHOD AND SYSTEM FOR A CALL TRANSFER

(75) Inventors: Prashant B. Desai, Land O'Lakes, FL (US); Juan M. Vasquez, Gibsonton, FL (US); Meyuresh M. Hegde, Irving, TX (US); Parind S. Poi, Lewisville, TX (US); Haridas Bhogade, Plant City, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 941 days.

(21) Appl. No.: 12/547,221

(22) Filed: Aug. 25, 2009

(65) Prior Publication Data

US 2009/0316877 A1 Dec. 24, 2009

Related U.S. Application Data

(63) Continuation-in-part of application No. 12/130,115, filed on May 30, 2008.

(51) Int. Cl.
- *H04M 3/42* (2006.01)
- *H04M 7/12* (2006.01)
- *H04M 3/54* (2006.01)
- *H04M 3/493* (2006.01)

(52) U.S. Cl.
CPC ........ *H04M 7/1205* (2013.01); *H04M 3/42102* (2013.01); *H04M 3/4938* (2013.01); *H04M 3/54* (2013.01)
USPC ............... 379/212.01; 370/352; 379/207.12; 379/207.15; 379/211.01; 379/221.01; 379/258; 455/445; 709/227

(58) Field of Classification Search
CPC ..... H04M 3/38–3/42357; H04M 7/00–7/0009; H04M 7/12–7/14; H04M 2203/152–2203/2094; H04L 45/00; H04L 65/1096; H04L 12/66; H04Q 2213/13091; H04Q 2213/13097; H04Q 2213/13141; H04Q 2213/1322–2213/13353; H04Q 2213/13541; H04Q 2213/13547; H04Q 3/72; H04W 4/02; H04W 40/00–40/38; H04W 76/00–76/066
USPC ................................. 370/351–357, 259–271; 379/265.01–266.1, 67.1–88.28, 379/142.01–142.18, 201.01, 211.01–241, 379/207.02–215.01, 219–234, 258; 709/201–207, 217–248; 455/412.1–426.2, 550.1–560, 455/575.1–575.9, 90.1–90.3, 445, 455/456.1–466; 704/270–278
See application file for complete search history.

(56) References Cited

U.S. PATENT DOCUMENTS

| | | | | |
|---|---|---|---|---|
| 5,452,350 A | * | 9/1995 | Reynolds et al. | 379/221.07 |
| 5,530,744 A | * | 6/1996 | Charalambous et al. | 379/266.08 |
| 5,600,704 A | * | 2/1997 | Ahlberg et al. | 455/445 |
| 5,805,688 A | * | 9/1998 | Gillespie et al. | 379/221.08 |
| 5,873,032 A | * | 2/1999 | Cox et al. | 455/417 |
| 5,982,870 A | * | 11/1999 | Pershan et al. | 379/211.02 |
| 6,011,844 A | * | 1/2000 | Uppaluru et al. | 379/220.01 |

(Continued)

*Primary Examiner* — Hemant Patel

(57) ABSTRACT

A system for and method of providing a gateway transfer mechanism is presented. In one exemplary embodiment, the system and method of providing a gateway transfer mechanism may be realized as a method, comprising identifying, at a gateway, a call to be routed to a first location, determining whether to transfer the call to a second location, in the event the call is to be transferred to the second location, transferring the call, wherein transferring the call comprises ending a process to route the call to the first location, generating transfer information for the second location, and transferring the call to the second location using the generated transfer information.

20 Claims, 3 Drawing Sheets

(56) References Cited

U.S. PATENT DOCUMENTS

| | | | |
|---|---|---|---|
| 6,061,347 A * | 5/2000 | Hollatz et al. | 370/352 |
| 6,208,856 B1 * | 3/2001 | Jonsson | 455/424 |
| 6,327,358 B1 * | 12/2001 | March et al. | 379/221.01 |
| 6,366,560 B1 * | 4/2002 | Ohiwane et al. | 370/238 |
| 6,456,709 B1 * | 9/2002 | Cox et al. | 379/218.01 |
| 6,668,049 B1 * | 12/2003 | Koch et al. | 379/211.02 |
| 6,845,155 B2 * | 1/2005 | Elsey | 379/266.04 |
| 6,879,676 B1 * | 4/2005 | Contractor | 379/211.01 |
| 7,062,028 B2 * | 6/2006 | Holt et al. | 379/211.03 |
| 7,203,294 B2 * | 4/2007 | Carnazza et al. | 379/142.07 |
| 7,218,722 B1 * | 5/2007 | Turner et al. | 379/221.02 |
| 7,266,190 B1 * | 9/2007 | Mullis et al. | 379/211.02 |
| 7,274,784 B2 * | 9/2007 | Bedingfield, Sr. et al. | 379/219 |
| 7,623,855 B1 | 11/2009 | Piercy | |
| 7,653,191 B1 * | 1/2010 | Glasser et al. | 379/201.1 |
| 7,953,099 B1 * | 5/2011 | Gatewood | 370/401 |
| 7,974,659 B2 | 7/2011 | Chin et al. | |
| 8,000,318 B2 * | 8/2011 | Wiley et al. | 370/352 |
| 2003/0169751 A1 | 9/2003 | Pulkka et al. | |
| 2005/0041785 A1 | 2/2005 | Joseph | |
| 2005/0129206 A1 * | 6/2005 | Martin | 379/211.01 |
| 2005/0220288 A1 * | 10/2005 | Huey | 379/265.02 |
| 2009/0129374 A1 | 5/2009 | Yurchenko et al. | |

* cited by examiner

METHOD AND SYSTEM FOR A CALL TRANSFER

CROSS-REFERENCE TO RELATED APPLICATIONS

The present application is a continuation-in-part of U.S. patent application Ser. No. 12/130,115 filed May 30, 2008 entitled "Method And System For A Gateway Transfer," the disclosure of which is hereby incorporated by reference in its entirety.

BACKGROUND INFORMATION

Voice portals are increasingly used to provide services for clients, employees and other users. Voice portals may provide menus, information, and other services to one or more callers. Transferring calls to a voice portal may require the use of a gateway, such as a media gateway, to transfer a call from one network to another. In many cases the unavailability of a voice portal to handle a transferred call may cause significant delays. It may be undesirable for a call to wait at a gateway for a resource in a second network to be available to handle a call. In some cases a transfer from a first network to a call destination in a second network may fail. Gateways receiving failed transfer calls may drop the calls. Gateways may lack a mechanism to handle failed transfer calls. Gateways may be incapable of routing a failed call to a call destination back on an originating network, such as a circuit switched telephone network.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF PREFERRED EMBODIMENTS

Reference will now be made in detail to exemplary embodiments, examples of which are illustrated in the accompanying drawings. It should be appreciated that the same reference numbers will be used throughout the drawings to refer to the same or like parts. It should be appreciated that the following detailed description are exemplary and explanatory only and are not restrictive.

An exemplary embodiment provides a gateway transfer system to one or more networks. The gateway transfer system may present improved call handling for one or more users.

Figure 1:
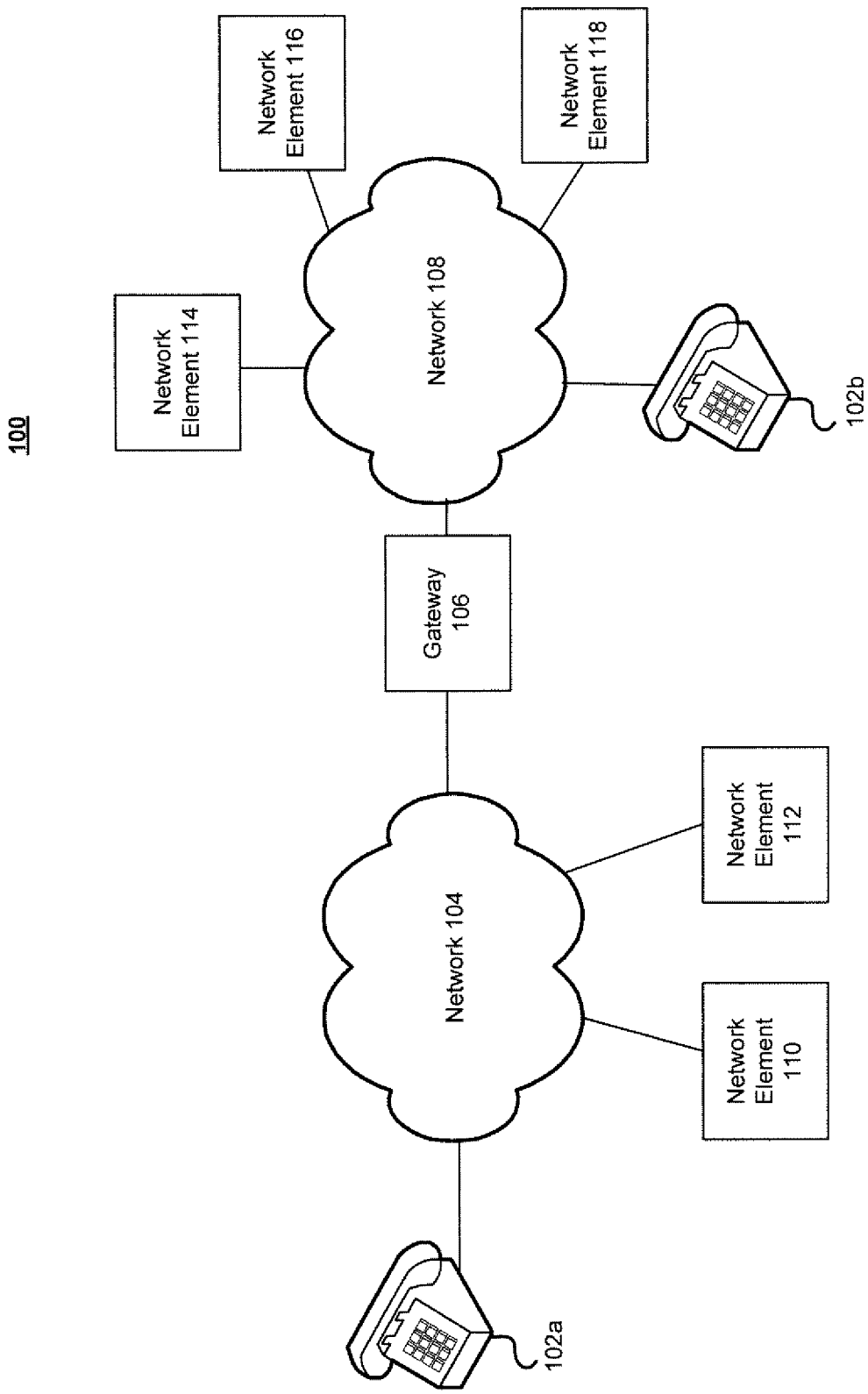
FIG. 1 is a schematic of a gateway transfer system, in accordance with an exemplary embodiment.

Referring to FIG. 1, a gateway transfer system in accordance with an exemplary embodiment is illustrated. System 100 illustrates an exemplary system for improving call handling at a gateway. As illustrated, the system 100 may include one or more networks, such as network 104 and network 108. Networks 104 and 108 may be communicatively coupled to the gateway 106. One or more telecommunication devices 102a and 102b may be communicatively coupled to networks 104 and 108. Other network elements, such as network elements 110, 112, 114, 116, and 118 may be communicatively coupled to networks 104 and/or 108.

The telecommunication devices 102 may be a wireline phone, a wireless phone, a satellite phone, Personal Digital Assistant (PDA), computer, or other telecommunication capable devices. The telecommunication devices 102 may be communicatively coupled to the network 104 and 108. The telecommunication devices 102 and network elements 110, 112, 114, 116 and 118 may send and receive data using one or more protocols. For example, data may be transmitted and/or received using Wireless Application Protocol (WAP), Multimedia Messaging Service (MMS), Enhanced Messaging Service (EMS), Short Message Service (SMS), Global System for Mobile Communications (GSM) based systems, Time Division Multiplexing (TDM) based systems, Code Division Multiple Access (CDMA) based systems, Transmission Control Protocol/Internet (TCP/IP) Protocols, or other protocols and/or systems suitable for transmitting and receiving data. Data may be transmitted and/or received wirelessly or may utilize cabled network connections or telecom connections such as an Ethernet RJ45/Category 5 Ethernet connection, a fiber connection, a traditional phone wireline connection, a cable connection or other wired network connection. Network elements 110, 112, 114, 116, and 118 may use standard wireless protocols including IEEE 802.11a, 802.11b and 802.11g. Network elements 110, 112, 114, 116, and 118 may also be communicatively coupled via protocols for a wired connection, such as an IEEE Ethernet 802.3.

Networks 104 and 108 may be one or more of a wireless network, a wired network or any combination of wireless network and wired network. For example, networks 104 and 108 may include one or more of a fiber optics network, a passive optical network, a cable network, an Internet network, a Public Switched Telephone Network (PSTN), a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting and/or receiving a data signal. In addition, networks 104 and 108 may include, without limitation, telephone line, fiber optics, IEEE Ethernet 802.3, a wide area network ("WAN"), a local area network ("LAN"), or a global network such as the Internet. Also networks 104 and 108 may support an Internet network, a wireless communication network, a cellular network, or the like, or any combination thereof. Networks 104 and 108 may further include one, or any number of the exemplary types of networks mentioned above operating as a stand-alone network or in cooperation with each other. Networks 104 and 108 may utilize one or more protocols of one or more network elements to which they are communicatively coupled. Networks 104 and 108 may translate to or from other protocols to one or more protocols of network devices. Although networks 104 and 108 are each depicted as a single network, it should be appreciated that according to one or more embodiments, networks 104 and 108 may each comprise a plurality of interconnected networks, such as, for example, a service provider network, the Internet, a broadcaster's network, a cable television network, corporate networks, and home networks.

Network elements 110, 112, 114, 116, and 118 may each be one or more servers (or server-like devices), such as a Session Initiation Protocol (SIP) server. Network elements 110, 112, 114, 116, and 118 may be telecom switches, Private Branch Exchanges (PBXs), Voice Response Units (VRUs), announcement servers, voice mail servers and/or voice portals. Network elements 110, 112, 114, 116, and 118 may be VoIP (Voice Over Internet Protocol) enabled devices. Network elements 110, 112, 114, 116, and 118 may include one or more processors (not shown) for recording, transmitting, receiving, and/or storing data. Although network elements 110, 112, 114, 116, and 118 are depicted as individual servers, it should be appreciated that the contents of network elements 110, 112, 114, 116, and 118 may be combined into fewer or greater numbers of servers (or server-like devices) and may be connected to one or more data storage systems (not shown). Data storage systems may be local or remote to network elements 110, 112, 114, 116, and 118.

Gateway 106 may be media gateway or Session Border Controller (SBC) interconnecting two or more networks. For example, gateway 106 may facilitate the routing of calls and other data between network 104 and network 108. Gateway 106 may facilitate the routing of calls between different network types such as between a circuit switched network and a packet switched network. In one or more embodiments, gateway 106 may be replaced by one or more switches (not shown) connecting two IP networks. In other embodiments, gateway 106 may be replaced by one or more switches (not shown) connecting two circuit switched networks. In some embodiments, gateway 106 may be replaced by one or more switches (not shown) connecting two portions of the same network.

In one or more embodiments, network 104 may represent a circuit switched network and network 108 may be a VoIP (Voice Over Internet Protocol) based network. Calls transferred across gateway 106 may occasionally fail to connect to their destination number. For example, network elements 114, 116 and 118 may be voice portals for handling calls. If a transfer to one of the voice portals fails because, for example, the voice portal is unable to handle the call, the gateway 106 may need to handle the call. The gateway 106 may utilize the DNIS (Dialed Number Information Service) associated with the call to determine how to handle the call. The gateway 106 may be provided with logic and data enabling the gateway 106 to look up DNIS information from a failed transfer call in order to map it to an alternate destination.

The gateway 106 may also utilize other call attributes to determine how to handle a call to be re-routed. For example, the gateway 106 may use Automatic Number Identification (ANI) information associated with the call. The gateway 106 may lookup, query, and/or map an alternate call destination using one or more call attributes. Routing of calls may be handled by looking up one or more call attributes in an array, a table, a file or other storage which may map an identifying aspect of the call to a destination. For example, the gateway 106 may contain an array mapping a number from DNIS information associated with a call to an alternate number. Network element 112 may represent a PBX or a switch communicatively coupled to a call center (not shown). A failed call to a voice portal on a network element 114 may be transferred by the gateway 106 to a call center associated with the network element 112. The gateway 106 may terminate the transfer process attempting to connect the call to the network element 114. The gateway 106 may look up the transfer information and may generate or download one or more DTMF tones to play to transfer the call to the network element 112 on the network 104.

In some embodiments, the gateway 106 may use DNIS information, ANI information, or other call attributes to query external sources of information, such as a database or a separate network element in order to determine routing information. If routing information is not found, gateway 106 may reattempt a transfer to the original call destination, may transfer the call to a default alternate destination, or may drop the call. Routing rules may also be implemented which may map calls to alternate locations based on call attributes. For example, the gateway 106 may determine to route a failed transfer call to an alternate location based on a geographical origination of the call and a geographical location of the alternate destination. Thus, the gateway 106 may route a failed transfer call originating from Florida to an alternate call destination in Florida. The gateway 106 may prioritize available alternate call destinations according to the distance of an alternate call destination point from a call origination point. The gateway 106 may determine alternate call destinations based on other factors such as, the time of day and/or the utilization of a potential alternate call destination.

According to one or more embodiments, the gateway 106 may determine whether a call has exceeded a specified wait time. If attempts to contact a call destination such as network element 118, which may be, for example, a voice portal, have exceeded a specified time, gateway 106 may determine to transfer the call. The call wait time may be determined, according to at least one embodiment, by using a Session Initiation Protocol (SIP) timer, such as a SIP session timer. Gateway 106 may use Automatic Number Identification (ANI) information received with the call to determine a transfer destination. Gateway 106 may use an array or other data structure mapping ANI information to a destination call location. For example, Numbering Plan Assignment (NPA) information from the ANI information may be used to query an array or other data structure to identify a call destination location (e.g., a call center). Gateway 106 may use one or more arrays or other data structures which may be grouped by customers. The mapping of one or more portions of ANI information may allow gateway 106 to transfer a call to a call destination geographically close to a call origination point. This may reduce the possibility of call being transferred to a region not supporting the caller. According to some embodiments, one or more TCL (Tool Command Language) scripts may be utilized on gateway 106 to perform one or more of processing of call mapping logic and generating call transfer information.

In addition to failed transfer calls, gateway 106 may handle other types of calls. In one or more embodiments, the gateway 106 may receive or have access to information about network element 114, network element 116, and/or network element 118. For example, the gateway 106 may receive data about a high call load and/or utilization of network element 114. The gateway 106 may make a determination to transfer a call to another network element, such as network element 110, which may be a PBX connected to a call center. The gateway 106 may also make a determination to transfer the call to the second location in response to a wait time at the gateway due to poor performance of one or more network elements on a destination network. The gateway 106 may determine to transfer a call to a second location according to one or more call attributes. For example, a call originating from a priority caller may be transferred to an alternate location corresponding to a call center instead of a Voice Response Unit (VRU). In some embodiments, the gateway 106 may transfer calls to alternate locations when an original call destination is undergoing scheduled maintenance. For example, if network element 118 has a scheduled maintenance period and the gateway 106 receives a call routed to network element 118 during that maintenance period, the gateway 106 may transfer the call to an alternate location.

Gateway 106 may generate transfer information such as in-band signaling to transfer a call for trunks utilizing in-band signaling. If a call is to be transferred to a trunk utilizing a secondary or D (data) channel for signaling, gateway 106 may generate, request, receive or otherwise obtain the appropriate out-of-band control signaling to transfer the call.

The various components of the system 100 as shown in FIG. 1 may be further duplicated, combined and/or integrated to support various applications and platforms. Additional elements may also be implemented in the systems described above to support various applications. One or more portions of system 100 may be implemented in executable software code stored on a computer readable medium, such as for example, electromagnetic based storage (e.g., disks and tape) and optical based storage (e.g., CD and DVD).

Figure 2:
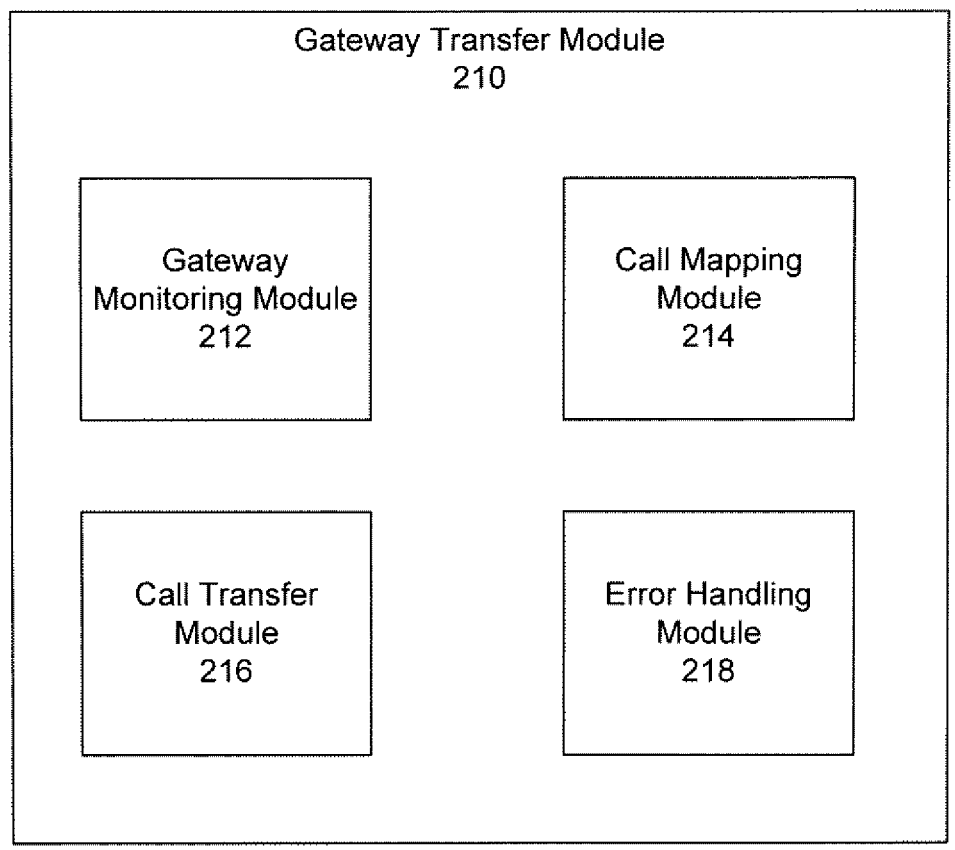
FIG. 2 depicts a block diagram of a module for a gateway transfer system, in accordance with an exemplary embodiment.

Referring to FIG. 2, a gateway transfer module 210 for improved gateway call handling is depicted, in accordance with an exemplary embodiment. As illustrated, the gateway transfer module 210 may contain one or more components including a gateway monitoring module 212, a call mapping module 214, a call transfer module 216, and an error handling module 218. The gateway transfer module 210 may improve call handling for failed transfer calls, priority calls, calls waiting at a gateway longer than a specified time, and other calls.

The modules of FIG. 2 may include computing software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

The gateway monitoring module 212 may monitor calls to determine if they meet one or more conditions. The gateway monitoring module 212 may handle failed transfer calls, priority calls, calls waiting at a gateway longer than a specified time, calls routed to a destination during a maintenance period for the destination, and other calls. The gateway monitoring module 212 may identify failed transfer calls by one or more errors detected or received in transferring the call. The gateway monitoring module 212 may identify priority calls by DNIS information associated with a call and/or call attributes associated with a call. The gateway monitoring module 212 may also use Automatic Number Identification (ANI) information to identify one or more call attributes. The gateway monitoring module 212 may also detect that one or more calls have been waiting for completion of a transfer to a call destination beyond a specified period of time. For example, gateway monitoring module 212 may use a Session Initiation Protocol (SIP) timer (e.g., a SIP session timer) to determine if a call has been waiting at gateway more than or equal to a specified period of time. The gateway monitoring module 212 may contain, receive or query information about one or more network elements. For example, the gateway monitoring module 212 may contain, receive or query information, about a scheduled maintenance period for a network element 114, a heavy call volume on a network element 116, and/or an outage associated with a network element 118. If the gateway monitoring module 212 detects a call requiring a transfer to an alternate location, the gateway monitoring module 210 may utilize the call mapping module 214.

The call mapping module 214 may receive information about a call requiring a transfer to an alternate location and may provide information specifying one or more alternate locations. For example, the call mapping module 214 may receive one or more call attributes or DNIS information associated with a call. The call mapping module 214 may also use Automatic Number Identification (ANI) information to identify one or more call attributes. The call mapping module 214 may utilize a lookup table, an array, a database, an interface to a local or remote system, mapping rules or other mapping methods to determine one or more alternate call destinations. Mapping rules or logic may utilize a time of day, a call origination geographic location, a call destination geographic location, a load or utilization of an alternate call destination, caller information associated with a call, priority information associated with a call, or other factors to determine one or more alternate call destinations. In some embodiments, the call mapping module 214 may provide one or more default alternate call destinations. For example, the call mapping module 214 may use one or more portions of Automatic Number Identification (ANI) information (e.g., Numbering Plan Assignment (NPA) information or area code information) to lookup an appropriate alternate call destination based on a geographic origin of a call. This may reduce the likelihood of a call being transferred to an incorrect destination, such as the incorrect call center for a customer.

The call transfer module 216 may receive one or more alternate call destinations from the call mapping module 214. The call transfer module 216 may generate transfer information for one or more alternate call destinations. For example, the call transfer module 216 may receive, generate or upload DTMF tones corresponding to the number for transferring to an alternate call location. In this example, the call transfer module 216 may concatenate audio files to provide a single audio file enabling the playing of the audio file to generate a transfer. The call transfer module 216 may cancel the transfer of the call to an original destination. The call transfer module 216 may then play an audio file to facilitate a transfer to a TDM (time division multiplexing) and/or a circuit switched network. In other examples, other techniques, such as Session Initiation Protocol (SIP) call signaling and setup techniques may be utilized. In some embodiments, the cancellation of an original transfer and the transferring to an alternate call destination may be known as a "take back and transfer."

The error handling module 218 may respond to one or more errors created by a failure of a transfer. The error handling module 218 may perform error trapping and one or more error handling actions. In some embodiments, the error handling module 218 may provide information about a failed network component such as the failure of one or more of network elements 110, 112, 114, 116, and/or 118. The error handling module 218 may provide information about one or more call routing errors.

Figure 3:
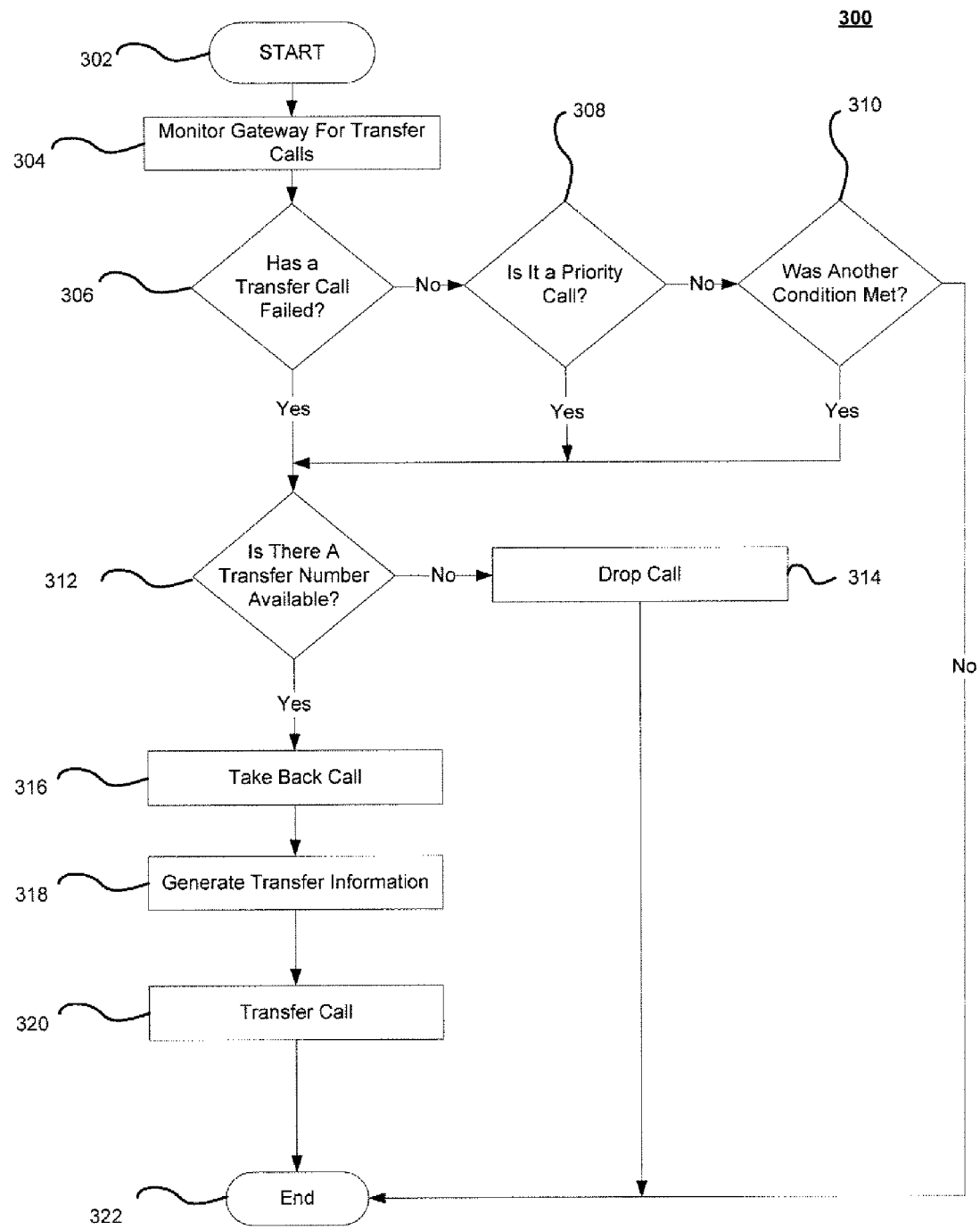
FIG. 3 depicts a flow chart for a method for implementing a gateway transfer system, in accordance with an exemplary embodiment.

FIG. 3 depicts a flowchart of a method 300 for implementing a gateway transfer system, according to an exemplary embodiment. The exemplary method 300 is provided by way of example, as there are a variety of ways to carry out methods disclosed herein. The method 300 shown in FIG. 3 may be executed or otherwise performed by one or a combination of various systems. The method 300 is described below as carried out by the system 100 shown in FIG. 1 by way of example, and various elements of the system 100 are referenced in explaining the example method of FIG. 3. Each block shown in FIG. 3 represents one or more processes, methods, or subroutines carried in the exemplary method 300. A computer readable media comprising code to perform the acts of the method 300 may also be provided. Referring to FIG. 3, the exemplary method 300 may begin at block 302.

At block 304, the transfer calls at the gateway may be monitored for one or more conditions. For example, the gateway may monitor for wait times above a specified level to transfer calls, priority calls, failed transfer calls, and other conditions.

At block 306, the gateway may detect if a transfer call has failed. For example, the gateway may determine that a transfer from a switched telephone network to a call destination on an IP (Internet Protocol) network has failed. In one or more embodiments, the method may detect a failed transfer from an IP network 108 to a switched telephone network 104. The method may also be implemented on a switch and may detect failed transfers between IP networks, between circuit switched networks, and/or within networks. If a failed transfer call has been detected the method may continue at block 312. If a failed transfer call has not been detected, the method may continue at block 308.

At block 308, the method may determine if a call is a priority call. The gateway 106 may receive one or more call attributes, DNIS information, and/or ANI information associated with a call. The gateway 106 may determine that an origination number associated with a call and/or a caller identity associated with a call requires priority treatment. If a call is a priority call the method may continue at block 312. If a call is not a priority call the method may continue at block 310.

At block 310, the method may determine whether another condition indicates that a call may require transferring to an alternate destination. Alternate conditions may be indicated by a known error or a high utilization of an original destination. Alternate conditions may also be indicated by a wait time for a transfer to complete exceeding a specified limit. According to some embodiments, a Session Initiation Protocol (SIP) timer may be used to determine if a call has been waiting at gateway more than or equal to a specified period of time. Alternate conditions may include scheduled maintenance or a planned outage of an original call destination. For example, the planned upgrade of a voice portal associated with network element 118 may be known to gateway 106. Thus calls routed for network element 118 during this period may be routed to an alternate destination. In one or more embodiments, information about utilization of call destinations may be received by a gateway and may be utilized to transfer calls to an alternate destination with a lower utilization.

At block 312, a mapping to an alternate call destination may be performed. In one or more embodiments, default alternate call destinations may be utilized. In some embodiments, DNIS information and/or attributes associated with a call may be utilized to determine an alternate call destination. Alternate call destinations may be determined not only by attributes of the call to be transferred but also by attributes of a potential alternate call destination. For example, a call may be transferred to an alternate destination within the same geographic region as the call origination point. A call may also be transferred to an alternate location corresponding to a lower utilized call destination. If an alternate call destination is not found, the method may continue at block 314. In some embodiments, if an alternate call destination is not found in a mapping array, file, database or other data structure, a default alternate call destination may be utilized. For example, if a gateway has no entries, rules or logic corresponding to DNIS associated with a call, it may transfer the call to a general number at a call center. Alternatively, a default alternate call destination may be a voicemail server. According to some embodiments, a mapping or other data structure may map one or more portions of Automatic Number Identification (ANI) information (e.g., Numbering Plan Assignment (NPA) information or area code information) to an appropriate alternate call destination. A Tool Command Language script may use the mapping to determine an appropriate call destination based on the call origin location and the possible call destination locations. If there is an alternate call destination available, the method may continue at block 316.

At block 314, if an alternate call destination is not found the method may drop the call. In one or more embodiments, the call may be transferred to an announcement server to play a message prior to dropping the call.

At block 316, the method may take back the call. This may consist of terminating a process and/or agent attempting to transfer the call to an original destination.

At block 318, the method may generate transfer information. For example, this may include a gateway 106 generating DTMF tones, downloading DTMF tones, concatenating multiple DTMF tones into a single audio file, and/or preparing other routing information. According to one or more embodiments, one or more processing steps may be performed by the execution of a Tool Command Language (TCL) script which may be stored on a computer readable medium, such as by way of non-limiting example, electromagnetic based storage (e.g., disks and tape) and optical based storage (e.g., CD and DVD).

At block 320, the call may be transferred. For example, this may include a gateway 106 playing DTMF tones to a circuit switched network to facilitate the routing of the call.

At block 322, the method may end.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method, comprising:
   identifying, at a gateway, a call to be routed to a first location;
   determining, at the gateway, whether to transfer the call to a second location;
   in the event the call is to be transferred to the second location, transferring the call, wherein transferring the call comprises:
   ending a process to route the call to the first location;
   generating transfer information for the second location;
   transferring the call to the second location using the generated transfer information; and
   determining the second location for the call, wherein the determining of the second location utilizes a mapping of at least one caller location to at least one re-routed destination and wherein the at least one caller location of the call is identified at least in part by one or more portions of Automatic Number Identification (ANI) information associated with the call and the at least one re-routed destination is selected as the second location for the call based in part on the geographic proximity of the at least one re-routed destination relative to the caller location.

2. The method of claim 1, wherein the one or more portions of Automatic Number Identification (ANI) information include Numbering Plan Assignment (NPA) information.

3. The method of claim 1, wherein determining the second location for the call is based at least in part a specified appropriate call center for a customer associated with the caller location.

4. The method of claim 1, wherein the generation of transfer information is performed at least in part using a Tool Command Language (TCL) script.

5. The method of claim 1, wherein the determination to transfer the call to the second location is in response to a wait time above a specified level at the gateway.

6. The method of claim 5, where the wait time is determined at least in part via the use of a Session Initiation Protocol (SIP) timer.

7. A computer readable media comprising code to perform the acts of the method of claim 1.

8. A system, comprising:
a gateway communicatively coupled to a first network and a second network;
a processor communicatively coupled to the gateway, wherein the processor is configured to:
  determine that a call routed for a first location is to be routed to a second location;
  identify the second location for the call;
  end a process to route the call to the first location;
  generate transfer information for the second location;
  transfer the call to the second location; and
  determine the second location for the call, wherein the determining of the second location utilizes a mapping of at least one caller location to at least one re-routed destination and wherein the at least one caller location of the call is identified at least in part by one or more portions of Automatic Number Identification (ANI) information associated with the call and the at least one re-routed destination is selected as the second location for the call based in part on the geographic proximity of the at least one re-routed destination relative to the caller location.

9. The system of claim 8, wherein the one or more portions of Automatic Number Identification (ANI) information utilized by the processor to determine the second location for the call include Numbering Plan Assignment (NPA) information.

10. The system of claim 8, wherein the processor is configured to determine the second location for the call based at least in part a specified appropriate call center for a customer associated with the caller location.

11. The system of claim 8, wherein the generation of transfer information is performed at least in part using a Tool Command Language (TCL) script.

12. The system of claim 8, wherein the first location comprises a voice portal.

13. A system, comprising:
a network element communicatively coupled to a network;
a processor communicatively coupled to the network element, wherein the processor is configured to:
  identify a call to be transferred to a first location;
  determine whether to transfer the call to a second location; and
  in the event the call is to be transferred to the second location, transfer the call wherein transferring the call comprises:
    ending a process to transfer the call to the first location;
    generating transfer information for the second location;
    transferring the call to the second location; and
    determining the second location for the call, wherein the determining of the second location utilizes a mapping of at least one caller location to at least one re-routed destination and wherein the call is identified at least in part by one or more portions of Automatic Number Identification (ANI) information associated with the call and the at least one re-routed destination is selected as the second location for the call based in part on the geographic proximity of the at least one re-routed destination relative to the caller location.

14. A system, comprising:
a gateway communicatively coupled to a first network and a second network;
a processor communicatively coupled to the gateway, wherein the processor is configured to:
  determine that a call routed for a first location is to be routed to a second location;
  identify the second location for the call;
  end a process to route the call to the first location;
  generate transfer information for the second location;
  transfer the call to the second location; and
  determine the second location for the call, wherein the determination of the second location utilizes a mapping of at least one caller location to at least one re-routed destination and wherein the caller location of the call is identified at least in part by one or more portions of Automatic Number Identification (ANI) information associated with the call and the at least one re-routed destination is selected as the second location for the call based in part on the geographic proximity of the at least one re-routed destination relative to the caller location.

15. The system of claim 14, wherein the one or more portions of Automatic Number Identification (ANI) information utilized by the processor to determine the second location for the call include Numbering Plan Assignment (NPA) information.

16. The system of claim 14, wherein the processor is configured to determine the second location for the call based at least in part a specified appropriate call center for a customer associated with the caller location.

17. The system of claim 14, wherein the generation of transfer information is performed at least in part using a Tool Command Language (TCL) script.

18. The method of claim 1, wherein determining whether to transfer the call to a second location is based on data received from a network element indicating call load at the network element or utilization of the network element.

19. The method of claim 1, wherein the second location for the call is further based on a time of day or a utilization of a potential alternate call destination.

20. The method of claim 1, wherein determining whether to transfer the call to a second location is based on a scheduled maintenance of the first location.

* * * * *